May 10, 1938.  G. W. BARBER  2,116,591
NEEDLE NOZZLE
Filed Nov. 5, 1937
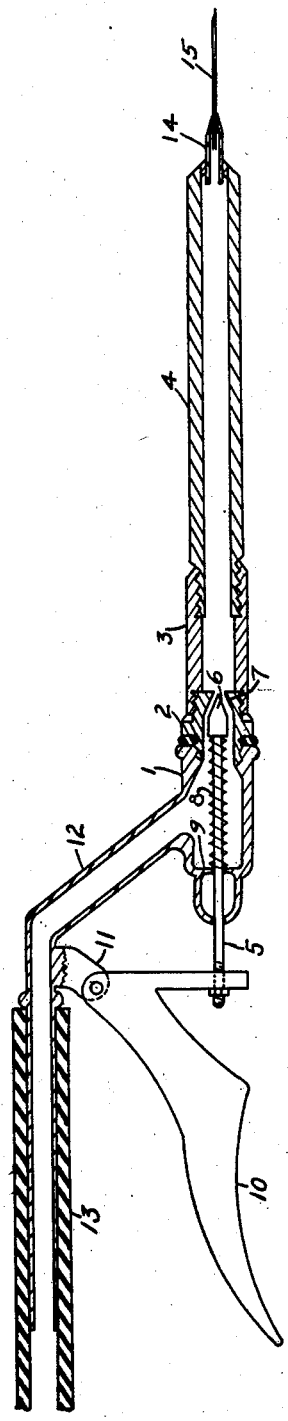
INVENTOR
G. W. BARBER
BY
ATTORNEYS Patented May 10, 1938

2,116,591

UNITED STATES PATENT OFFICE 2,116,591

NEEDLE NOZZLE

George W. Barber, New Haven, Conn.; dedicated to the free use of the People of the United States of America Application November 5, 1937, Serial No. 172,929

2 Claims. (Cl. 47—57)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to me of any royalty thereon.

I hereby dedicate the invention herein described to the free use of the People of the United States of America to take effect on the granting of a patent to me.

This invention relates to a needle nozzle and is more particularly concerned with a needle nozzle adapted for use in spraying insecticides into ears of corn, or any other plants or plant parts, in combating the corn earworm, or any other insect which feeds interiorly within such plants or plant parts.

The young larvae of the corn earworm begin their feeding among the internal silk threads of a corn ear. Insecticides such as sprays cannot be placed in this location with the equipment now available. Heretofore, it has been attempted to cause the spray to reach the part of the corn ear mentioned by the use of spreading agents, whose function it is to cause the spray to run along the silk threads from the exterior where the spray can be placed with ordinary equipment to the interior silk, where the young larvae begin feeding.

The object of this invention is to make available equipment through the use of which insecticide sprays can be placed directly on the internal silks of corn, making certain that these silks are thoroughly covered with an insecticide spray, so that caterpillars, or other insects, feeding therein will be killed. In this way the corn ear may be protected against injury by insects entering through the silk.

One advantage of this invention is that the insecticide can be placed saliently in the corn silks where it is surrounded by the husks, so that only a very small amount of spray material is necessary, at the same time eliminating any waste of the insecticide through run-off. Due to this economy insecticides can be used at greater concentrations than when applied externally, thus increasing the percentage of mortality of the insects.

Another advantage is that the insecticide can be placed directly where the insects feed within the silk of the corn ears, and one treatment can be made sufficient for any ear, as compared with several successive treatments of ears when the spray or dust is applied externally.

Still another advantage is that by the use of this invention, rain, dew, sun, and other natural factors which affect insecticides applied externally, do not affect the insecticide injected under the corn husk.

A further advantage in using this invention is that the wound or puncture made in the corn husks is not large enough to interfere with the further growth or appearance of the corn.

A still further advantage is that by the use of this invention, smaller containers may be used to carry the spray material, because of the economy of the insecticide spray as above mentioned.

The following specification, together with the accompanying drawing, will fully disclose this invention, and further objects and advantages thereof will be apparent.

Referring with more particularity to the drawing, which discloses a longitudinal cross-sectional view of this invention, the numerals 1, 2, 3 and 4 designate three hollow metallic sections connected in series, substantially as shown. Disposed within the sections 1 and 2 is an automatic cut-off valve consisting of a plunger rod 5, a plunger 6 secured to one end of said plunger rod, a plunger seat 7, and a plunger spring 8 compressively mounted on said plunger rod between the plunger 6 and the wall 9 of said section 1. The other end of the plunger rod 5 is secured to a vertical arm of the bent operating lever 10, which lever is pivotally mounted on the bracket 11. Said bracket 11 is a fixed part of the bent pipe 12, which pipe communicates with the interior of section 1. The said pipe 12 extends rearward over the horizontal arm of the bent lever 10, and is adapted to receive the end of a hose 13, which when in place forms a handle for operating said lever 10.

At the other end of section 4 a reducing nipple 14 is inserted, which in turn carries a hollow hypodermic needle 15, the tip of which is tapered to a point.

The following dimensions are recommended, but are not deemed indispensable, for the hypodermic needle 15: 40 millimeters long and an over-all breadth of 2 millimeters with a central opening channel 1 millimeter in diameter.

The operation of this invention is as follows: The hose 13 is connected to a tank or other reservoir containing a suitable insecticide under suitable pressure. The hypodermic needle is then inserted through the husks of a corn ear. The lever 10 is then pressed toward the handle, which opens the valve by pulling plunger 6 away from the plunger seat 7 against the fluid pressure of the insecticide and against the action of the spring 8. The opening of this valve permits the insecticide under pressure to flow through the entire length of the device and out through the needle 15 into the corn husks. When the desired amount of insecticide has been emitted, the lever 10 is released and the force of the fluid pressure of the insecticide, together with the spring 8 against the plunger 6 pushes the plunger back against the plunger seat 7, thereby automatically closing the valve and shutting off the supply of the insecticide.

Having thus described my invention, I claim:

1. In a needle nozzle insecticide ejector, a plurality of progressively reduced sections in series attached, the largest section carrying a plunger, a plunger seat carried by the adjoining section, a hollow needle carried by the smallest section, a handle constituting an intake pipe to said largest section, and a lever for operating said plunger.

2. In a needle nozzle insecticide ejector, a plurality of progressively reduced sections, in series attached, consisting of a plunger section, a plunger seat section, a coupling section, and a nipple section, a hypodermic needle carried by said nipple section, a plunger seat carried by said plunger seat section, a plunger normally seated in said plunger seat, a spring compressibly mounted between said plunger and said plunger section, a plunger rod having one end secured to said plunger and its other end connected to an exterior operating lever, and a means for introducing an insecticide into said plunger section.

GEORGE W. BARBER.